United States Patent [19]

Potter

[11] 4,410,190

[45] Oct. 18, 1983

[54] FLUID SEAL PUMPING EFFECT LIP SEAL FOR ROTARY SHAFT

[75] Inventor: Charles W. Potter, Manchester, England

[73] Assignee: J. H. Fenner & Co. Ltd., Hull, England

[21] Appl. No.: 215,857

[22] Filed: Dec. 12, 1980

[30] Foreign Application Priority Data

Dec. 21, 1979 [GB] United Kingdom ................. 7944249
Sep. 19, 1980 [GB] United Kingdom ................. 8030422

[51] Int. Cl.³ .............................................. F16J 15/32
[52] U.S. Cl. .................................... 277/153; 277/166; 277/178; 277/134
[58] Field of Search ............... 277/152, 153, 165, 166, 277/178, 181–184, 189, 134

[56] References Cited

U.S. PATENT DOCUMENTS

| | | | |
|---|---|---|---|
| 2,316,713 | 4/1943 | Procter | 277/153 |
| 3,099,454 | 7/1963 | Walinski | 277/152 X |
| 3,640,542 | 2/1972 | Mowat et al. | 277/134 |
| 3,871,669 | 3/1975 | Repella | 277/153 X |
| 4,278,261 | 7/1981 | Miura et al. | 277/153 |

FOREIGN PATENT DOCUMENTS

| | | | |
|---|---|---|---|
| 813226 | 9/1951 | Fed. Rep. of Germany | 277/153 |
| 901976 | 1/1954 | Fed. Rep. of Germany | 277/153 |
| 972155 | 5/1959 | Fed. Rep. of Germany | 277/152 |
| 834045 | 8/1938 | France | 277/153 |
| 884988 | 12/1961 | United Kingdom | 277/153 |
| 1057629 | 2/1967 | United Kingdom | 277/153 |
| 1382281 | 1/1975 | United Kingdom . | |
| 1536659 | 12/1978 | United Kingdom . | |
| 136136 | 5/1959 | U.S.S.R. | 277/153 |

*Primary Examiner*—Robert S. Ward, Jr.
*Attorney, Agent, or Firm*—Prutzman, Kalb, Chilton & Alix

[57] ABSTRACT

A moulded seal for a fluid seal arrangement which requires no trimming of the sealing which comprises an elastomeric frusto-conical body part having a sealing lip at its inner face in spaced disposition relative to the lesser diameter end thereof. In use, the space between the sealing lip and the adjacent free end of the body is subjected to an hydrodynamic pumping action away from the lip on displacement of the shaft to reduce fluid pressure in the region of the lip and hence discourage leakage. Various seal arrangements embodying the moulded seal are also disclosed.

11 Claims, 4 Drawing Figures

FLUID SEAL PUMPING EFFECT LIP SEAL FOR ROTARY SHAFT

The invention concerns seals, and has particular, though not exclusive, reference to seals for sealing the annular gap between relatively rotating members such as a rotary shaft and a housing from which such shaft extends.

Synthetic rubber materials are friction producing, and this gives rise to temperatures at the sealing edge sufficient, in some instances, to give rise to excessive shaft and sealing edge wear.

The oil film thickness under the radial lip of a lip seal is of the order of 5 to 20 microns, which allows a meniscus on the sealing surface having no visible fluid leakage to the air side. Over a period of time the sealing surface increases in area with a resultant increase of the meniscus, continued wear leading ultimately to a condition where visible leakage occurs. To counteract the leakage, various hydrodynamic fluid return formations have been added to the seal, but although these formations are initially effective, their effectiveness does diminish with increasing wear.

With increasing wear on the sealing edge, the sealing surface operates like a bearing and leaks when the wear band exceeds 2 mm in width, a hydrodynamic film of fluid being established in opposition to the radial compressive forces of the lip and which forces the flexible element away from the shaft sufficient to promote unacceptable leakage.

Current lip seal profiles usually have a vee angle contact to the shaft, the lip diameter usually being produced by trimming away the material from the frustrum face at an angle of 30° to 45° to the axis of the seal.

Manufacturing tolerances on the lip diameter of the seal element change the relationship of the centreline of the garter spring relative to the sealing edge and thus give rise to a non-uniformity of product. A moulded lip which requires no trimming operation to produce the required bore interference to the shaft would reduce the manufacturing cost and, more importantly, ensure a more consistent alignment of the radial load to the sealing edge, but, despite many attempts to mould sealing lips, considerable variability exists, primarily due to minute surface imperfections on the sealing surface and porosity at the sealing edges which affect the sealing edge meniscus, and no satisfactory moulded seal has yet been produced.

The object of the present invention is to provide a moulded seal which avoids the problems inherent in prior proposed such seals.

According to the present invention there is proposed a moulded seal comprising a flexible, sleeve-like body characterised by a sealing lip formed therewith and which extends outwardly from that surface of the body opposed to the surface to be sealed in spaced-apart disposition relative to the free end of such body.

According to a preferred feature, the said body is of frusto-conical form, and the said lip is provided in closely spaced disposition relative to the lesser diameter end thereof.

According to a further preferred feature, the sealing lip is spaced from the adjacent end of the body by a distance in excess of the thickness of the body at that end.

The invention will now be described further by way of example only, with reference to the accompanying drawings illustrating several embodiments thereof and in which.

Figure 1:
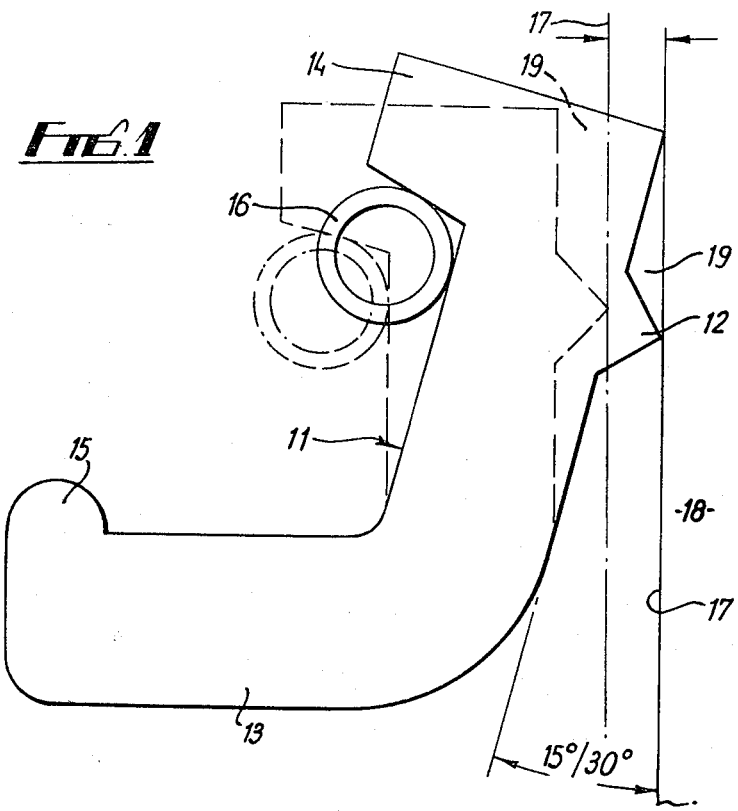
FIG. 1 is a diagrammatic cross-section taken through a flexible, sleeve-like body made in accordance with the present invention.

Referring now to the drawings, and particularly to FIG. 1 thereof, a sealing member for a metal case-seal assembly comprises a sleeve-like body 11 moulded from synthetic rubber, the said body having a sealing rib 12 at its inner periphery arranged in spaced-apart disposition relative to an end thereof.

The body 11, which body is conveniently moulded from synthetic rubber of 60 to 80 IRHD (meaning International Rubber Hardness) and of substantially constant wall thickness, is of frusto-conical form and has outwardly extending flanges 13, 14 at the respective ends thereof. The flange 13 at the larger diameter end is intended for use in supporting the body 11 in a metal casing (not shown) and includes a bead 15 adjacent its periphery to facilitate location of the body in such casing, whilst the flange 14 at the opposite end serves to locate a garter spring 16 for loading the sealing rib into sealing engagement with the surface 17 of the shaft 18 to be sealed.

The cone angle of the frusto-conical body 11 is between 15° and 30°, and the height and disposition of the rib 12 is such that the same will contact the surface 17 at full radial displacement of the shaft. In the embodiment illustrated, the rib is of a triangular cross-section and is spaced from the small end of the frusto-conical body by a distance approximately equal to the thickness of such body.

As will readily be appreciated, by avoiding the need to machine the body, the disposition of the centreline of the garter spring 16 in relation to the sealing rib will remain constant within the moulding tolerances of the sealing member, and will thus allow of a greater uniformity in product than is possible with conventional lip seals wherein machining is necessary. Furthermore, by moving the sealing contact edge away from the end face of the moulding, porosity of the material in the region of the seal can be reduced and thus a consistent quality and more reliable seal performance can be achieved.

We have found that, in addition to the improved quality and performance, the displacement of the sealing lip relative to the end face of the frusto-conical body does give rise to an hydrodynamic pumping action in the region of the seal. The variation in the dimension of the annular cavity 19 defined by and between the frusto-conical body 11 and the shaft 18 consequent on shaft deflection is, in many applications, sufficient to lower the oil pressure at the rib 12 and thus militates against leakage past the sealing rib. In addition, there is an advantageous effect on the temperature at lip/shaft interface due to heat extraction by the hydrodynamic pumping action, and the temperature at the interface approximates to that of fluid being sealed.

Figure 2:
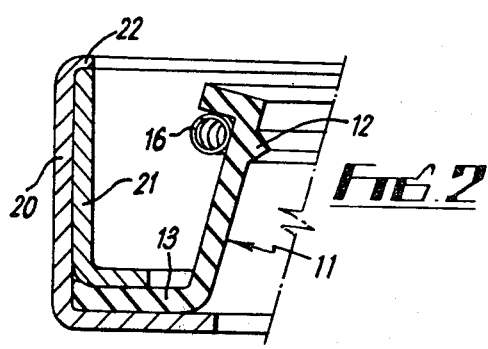
FIG. 2 is a diagrammatic cross-section of a metal case-seal assembly embodying a sleeve-like body of the kind shown in FIG. 1.

A typical example of seal assemblies embodying the sealing member of FIG. 1 is illustrated diagrammatically in FIG. 2, the sealing member being shown in a metal casing 20 of L-shaped cross-section and being secured therein by a lock ring 21 bearing on the flange 13, the lock ring being held captive in the casing by the swaged over lip 22 formed on the casing.

In FIG. 1, the sealing member 19 and shaft 18 are illustrated in full lines in a deflected position and in broken lines in a normal or non-deflected position.

Figure 3:
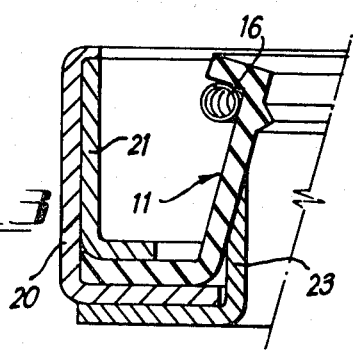
FIGS. 3 and 4 are views corresponding to FIG. 2, and illustrate modified forms of the seal assembly shown therein.
Figure 4:
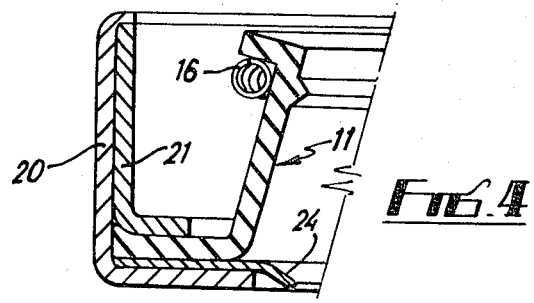

Modifications of the assembly shown in FIG. 2 are illustrated in FIGS. 3 and 4, FIG. 3 teaching the inclusion of a reinforcing ring 23 for supporting the flexible frusto-conical body part, and FIG. 4 teaching the incorporation of a dust lip 24 to limit ingress of dust or other contaminants. Although the reinforcing ring is shown as being attached to the outside of the casing, such ring may, if preferred, have the radial flange thereof interposed between the flange of the casing and that of the body part.

It may be found convenient to provide a contaminant rejection and/or leakage return formation on the sealing rib 12 and at the low pressure side thereof, such typical arrangements thereof being disclosed in the specifications and drawings of our prior United Kingdom Patent Nos. 1,382,281 and 1,536,659, to which attention is directed for further detail.

I claim:

1. In or for a fluid seal arrangement for relatively rotatable members such as a housing and a shaft having a surface to be sealed, a moulded seal comprising an axially extending flexible sleeve-like body having an outer free end, ordinarily spaced from the surface to be sealed, a surface generally coaxial with and opposed to the surface to be sealed, and an integral annular sealing lip projection having a pointed sealing edge engageable with the surface to be sealed about the full periphery thereof, the annular sealing lip projection being of minor axial dimension relative to the axial length of the flexible sleeve like body and being provided in spaced-apart disposition relative to the outer free end of the sleeve-like body, and the said opposed surface of the body extending toward the surface to be sealed from the sealing lip projection to said outer free end to provide a variably dimensioned annular fluid cavity for pumping fluid away from the edge of the sealing lip projection at the intended high pressure side of such projection.

2. A moulded seal as defined in claim 1 wherein the said sealing edge on the sleeve-like body is engageable with the surface to be sealed to provide a pivot edge for that part of the sleeve like body between the sealing lip projection and its said outer free end.

3. A moulded seal as claimed in claim 1, wherein the opposed surface extension of the flexible sleeve-like body from the sealing lip to its outer free end has a cone angle between 15° and 30°.

4. A moulded seal as claimed in claim 1, wherein the sealing lip projection is provided in closely spaced disposition relative to the free end of the body and at the inner surface thereof.

5. A moulded seal as claimed in claim 1, wherein the sealing lip projection is spaced from the free end of the body by a distance in excess of the thickness of the body at that end.

6. A moulded seal as claimed in claim 1, wherein generally radially outwardly extending flanges are provided at the opposed ends of the body and at that surface thereof remote from the sealing lip projection.

7. A moulded seal as claimed in claim 6, wherein that flange provided at the end of the body remote from the free end of the body includes a location bead extending in the axial direction of the seal.

8. A seal arrangement including a moulded seal as claimed in claim 1.

9. A seal arrangement as claimed in claim 8, including a casing and a lock ring each of L-shaped transverse cross-section, the respective flanges of the casing and lock ring being disposed in adjacent spaced disposition and receiving a flange provided at an end of the seal body remote from its free end in clamped relationship therebetween.

10. A seal arrangement as claimed in claim 9, wherein the lock ring is positioned radially inwardly of the casing and is located axially thereof by a lip on the casing in surface engagement with an end face of the lock ring.

11. In or for a fluid seal arrangement for sealing an annular gap between relatively rotatable members such as a housing and a shaft, a moulded seal comprising a flexible sleeve-like body mountable in the housing and having an outer free end, a surface generally coaxial with and opposed to the surface of the shaft and an integral sealing lip projection which extends outwardly from the said opposed surface, the sealing lip projection being arranged in spaced-apart disposition relative to the free end of the sleeve-like body and having a sealing edge engageable with the shaft about the full periphery thereof and to provide a pivot point for that part of the sleeve like body existing between the sealing lip projection and the free end of the said body, and the said opposed surface of the body extending towards the shaft from the sealing lip projection to said outer free end to provide a variably dimensioned annular fluid cavity for pumping fluid away from the sealing edge.

* * * * *